Jan. 1, 1952 P. P. OSTEVIK 2,580,458
CALENDAR WORK FOR CLOCKS AND WATCHES
Filed March 3, 1949 7 Sheets-Sheet 1

INVENTOR.
Peter P. Ostevik
BY Victor J. Evans & Co.

ATTORNEYS

Jan. 1, 1952   P. P. OSTEVIK   2,580,458
CALENDAR WORK FOR CLOCKS AND WATCHES
Filed March 3, 1949   7 Sheets-Sheet 2
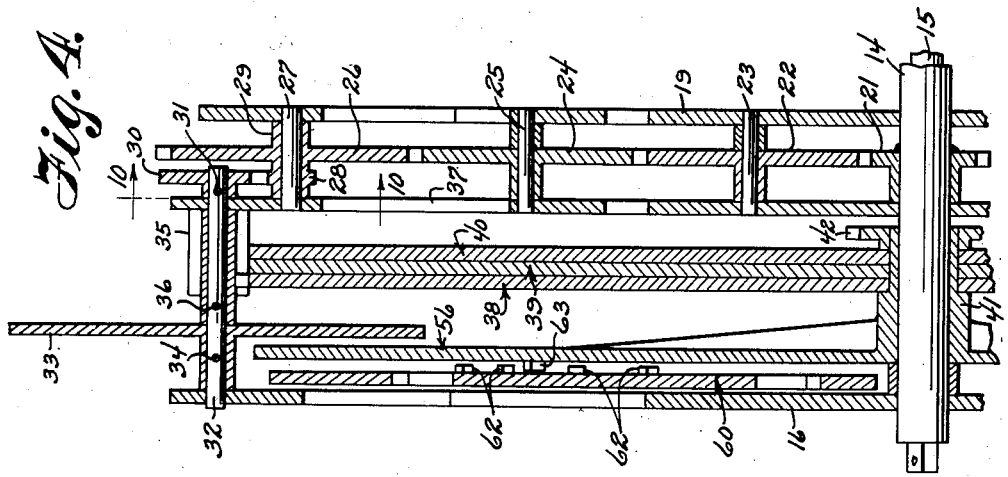
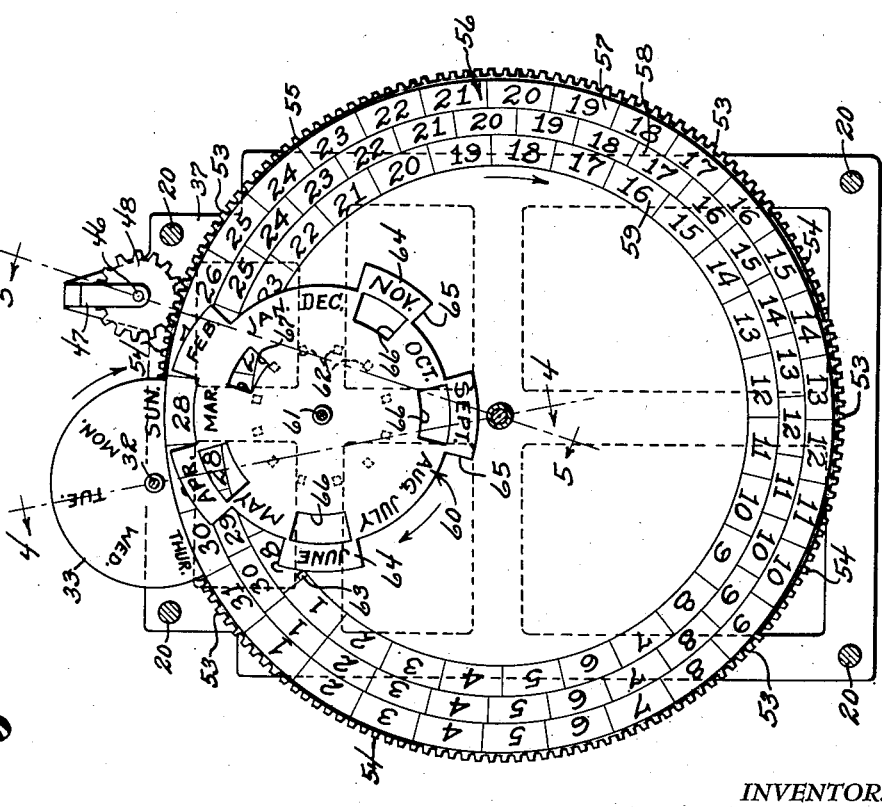
INVENTOR.
Peter P. Ostevik
BY *Victor J. Evans & Co.*
ATTORNEYS

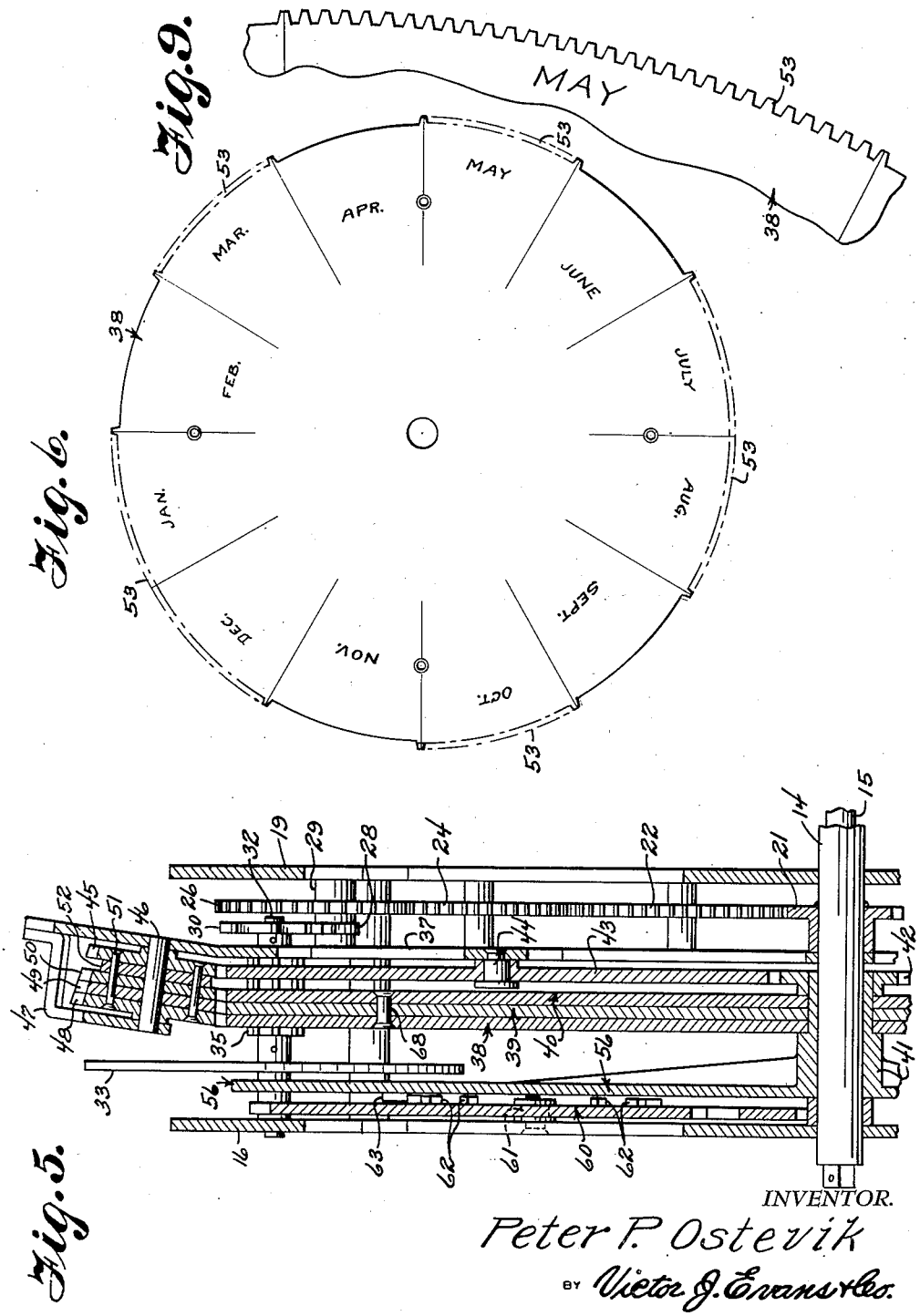

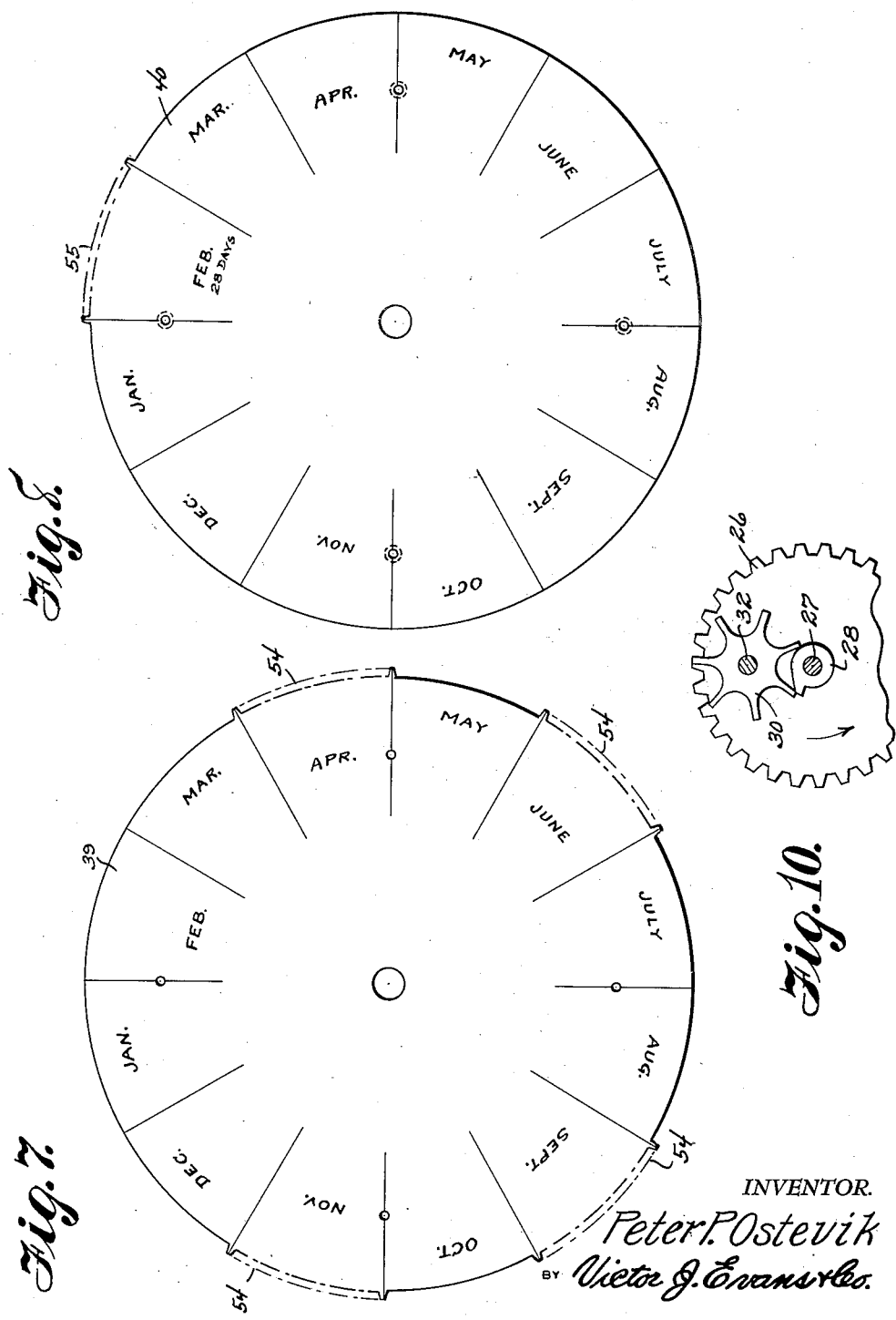

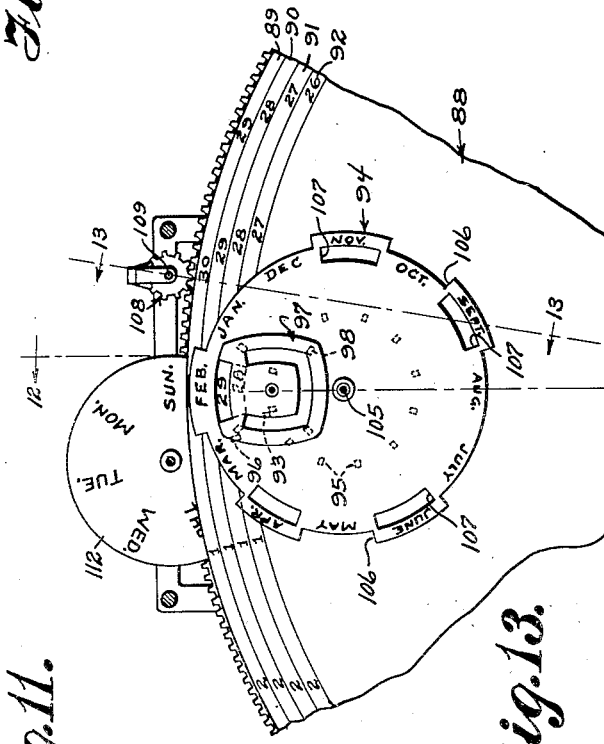

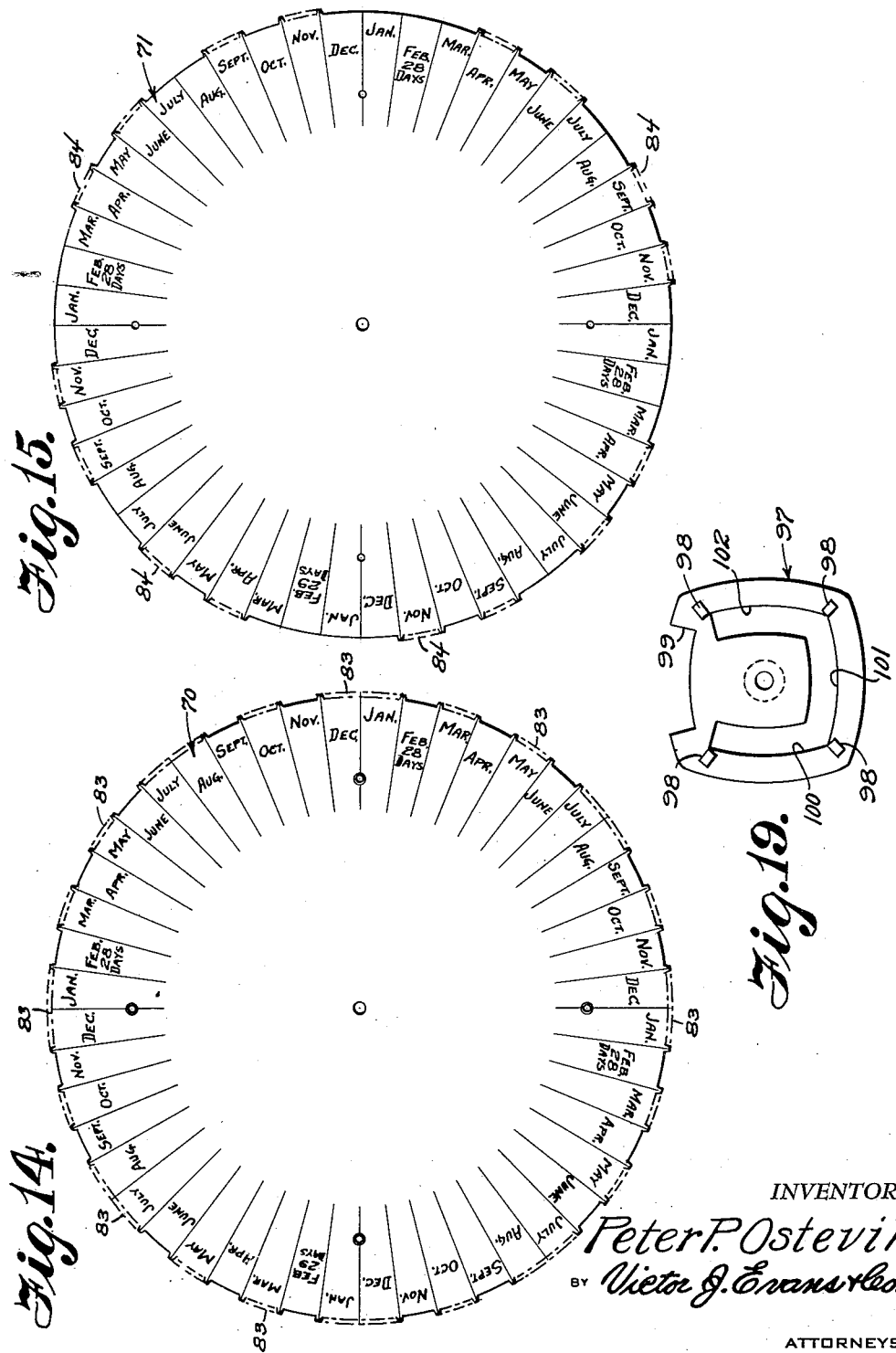

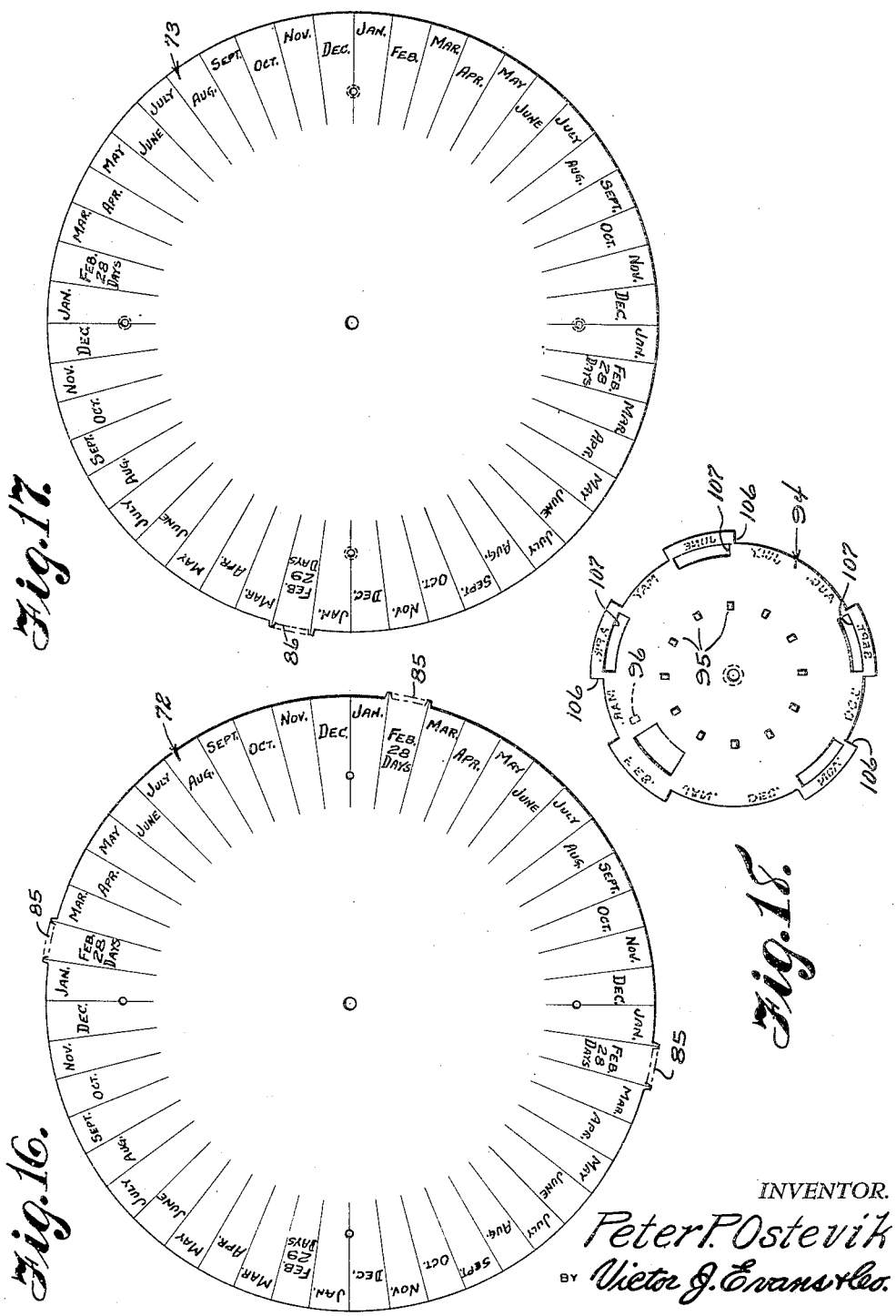

Patented Jan. 1, 1952

2,580,458

UNITED STATES PATENT OFFICE 2,580,458

CALENDAR WORK FOR CLOCKS AND WATCHES

Petter P. Ostevik, Molde, Norway

Application March 3, 1949, Serial No. 79,375

7 Claims. (Cl. 58—5)

This invention relates to calendar attachments adapted to be incorporated in clocks wherein the days of the week, days of the month, and the names of the months automatically appear in proper sequence in a window in the face of a clock.

The purpose of this invention is to provide a calendar attachment for clocks that may be incorporated in the face of the clock and operated by the hour hand thereof which is adapted to operate continously and without adjustment for a period of four years and which may be provided with an additional element with which it may operate for longer periods.

Various types of clock mechanism have been used to operate calendar elements for continuous operation thereof but devices of this type are confronted with the irregularity of the numbers of days of the months particularly in leap year and the elements required to compensate for the uneven number of days in the different periods often place too great a burden on the operating means of the hour hand of a clock to be operated thereby. With this thought in mind this invention contemplates a plurality of superimposed discs and gears positioned directly behind the face of a clock, mounted on the hour hand shaft and operated thereby.

The object of this invention is, therefore, to provide a comparatively simple arrangement of gears and discs that is adapted to be incorporated in a clock and operated by the hour hand shaft thereof which will operate continuously for a period of four years or more to provide a calendar in combination with the clock.

Another object of the invention is to provide a combination calendar and clock that is positive in operation and operates continuously without resetting.

Another object of the invention is to provide a combination clock and calendar that operates continuously for a period of four years without resetting in which means may be provided for extending the time of operation thereof.

Another object of the invention is to provide calendar operating instrumentalities that may be combined with and incorporated in clock works of the mechanical or electric type.

Another object is to provide means in a calendar mechanism for clocks for compensating for the different numbers of days in the month of the year.

A further object of the invention is to provide a calendar mechanism adapted to be incorporated in clocks and operated by the hour hand shaft thereof which is of a comparatively simple and economical construction.

With these and other objects and advantages in view the invention consists of a new and useful combination, construction, and arrangement of parts as hereinafter more fully described, set forth in the claims appended hereto, and disclosed in the accompanying drawings forming part thereof, wherein:

Figure 3 is an elevational view taken on line 3—3 of Figure 2 with the clock housing omitted and showing the calendar dials.

Figure 4 is a cross section on enlarged scale taken on line 4—4 of Figure 3 illustrating the arrangement of a calendar operating gears.

Figure 5 is a similar section taken on line 5—5 of Figure 3 showing the arrangement of gears of different diameters which compensate for the different numbers of days of the month.

Figure 6 is an elevational view of an operating disc having gear segments thereon for operating the means for indicating months having thirty-one days.

Figure 7 is a similar view showing a disc having gear segments thereon for operating means for indicating the names of months having thirty days.

Figure 8 is a similar view showing a disc having a gear segment thereon for operating the means for indicating the month of February having twenty-eight days.

Figure 9 is a detail showing a section of one of the discs having a gear segment with thirty-one teeth therein for actuating the month indicating means of months having thirty-one days therein.

Figure 10 is a detail taken on line 10—10 of Figure 4 showing the cam for operating the actuator having seven recesses therein corresponding with the days of the week.

Figure 11 is a detail showing the upper part of the calendar mechanism illustrating a modification wherein means is provided whereby the calendar will operate continuously for periods longer than four years.

Figure 12 is a vertical section taken through the upper part of the calendar mechanism and taken on line 12—12 of Figure 11.

Figure 13 is a similar section taken on line 13—13 of Figure 11 with the lower parts of the elements broken away.

Figure 14 is a front elevational view of a calendar disc used in the modification illustrated in Figure 11 and containing gear segments for months having thirty-one days.

Figure 15 is a similar view also showing a disc for the calendar illustrated in Figure 11 and having gear segments for the months having thirty days.

Figure 16 is a similar view showing a disc having gear segments for the month of February having twenty-eight days.

Figure 17 is also a similar view showing a disc having a gear segment for the month of February in leap year wherein February has twenty-nine days.

Figure 18 is a front elevational view of the small disc positioned in front of the disc shown in Figure 14 that is adapted to be actuated through one step with each revolution of the large disc for displaying the names of the months.

Figure 19 is a detail showing the device that operates once every four years to display the month of February having twenty-nine days therein.

Figure 2:
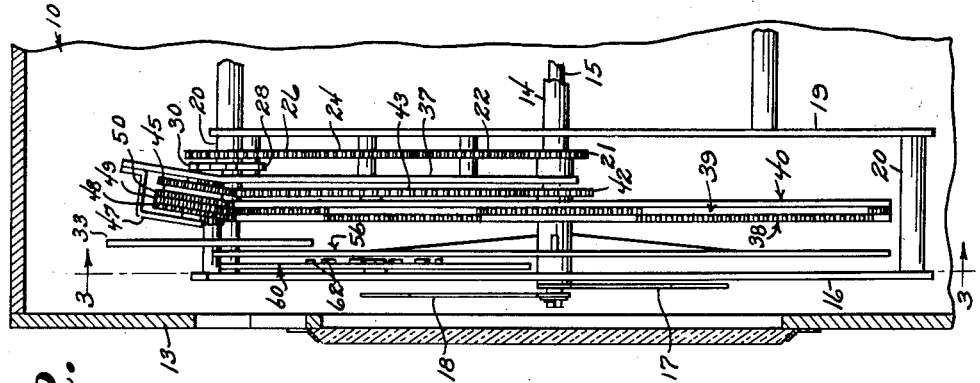
Figure 2 is a vertical transverse section through the forward part of a clock showing the calendar operating instrumentalities therein with the rear portion of the clock broken away.

Referring now to the drawings wherein like reference characters denote corresponding parts the combination calendar clock of this invention includes a clock casing 10 having a dial 11 with a window 12 in the front wall 13 of the clock through which the days of the week, the days of the month, and the names of the months are displayed.

The calendar actuating instrumentalities are mounted on the tubular hour hand shaft 14 of the clock and, as shown in Figures 4 and 5, the minute hand shaft 15 extends through the shaft 14. The clock dial 11 is provided on a plate 16 and the hour hand 17 and the minute hand 18 are positioned in front of the plate as shown in Figure 2. The plate 16 is supported from a plate 19 on the front of the clock works by posts 20 and with the parts arranged in this manner the complete calendar mechanism is provided in the space between the clock works and dial of the clock.

The calendar mechanism is operated from the tubular hour hand shaft 14 by a pinion 21 which meshes with a gear 22 on a shaft 23, the gear 22 meshes with a gear 24 on a shaft 25 and the gear 24 meshes with a gear 26 on a shaft 27. With this train of gears the gear 26 rotates in a counter-clockwise direction and a cam 28 on a hub 29 thereof turns the actuator 30 one step each time the gear 26 makes one complete revolution. The diameter of the gear 26 is twice that of the gear 21 so that the actuator 30 is only moved one step every twenty-four hours. The actuator 30 is secured by a pin 31 to the shaft 32 and a disc 33 containing the days of the week is also fixedly mounted on the shaft 32 by a pin 34. The shaft 32 is also provided with a pinion 35 and the pinion 35 is fixedly mounted on the shaft by a pin 36. The outer end of the shaft 32 is journaled in the plate 16 and the inner end is journaled in an intermediate plate 37 spaced from the plate 19 and in which the outer ends of the shafts 23, 25 and 27 are also journaled.

The pinion 35 is positioned to mesh with the gear segments on the peripheral surfaces of the discs 38, 39 and 40 respectively, and these discs are freely mounted to rotate on a bushing 41 on the shaft 14. The discs 38, 39 and 40 rotate in a counter-clockwise direction whereas the bushing 41 is rotated in a clockwise direction.

The bushing 41 is rotated by a pinion 42 fixedly mounted thereon and the pinion 42 meshes with a gear 43 journaled on a pin 44 and rotated by a pinion 45 which is mounted in a slightly sloping position on a shaft 46 which is mounted between the upper end of the plate 37 and the bracket 47 that extends therefrom. The pinion 45 is secured to a set of pinions 48, 49 and 50 by rivets 51 with a spacer 52 between the pinions 45 and 50. The pinions 48, 49 and 50 are positioned to mesh with and are operated by gear segments 53, 54 and 55 of the discs 38, 39, and 40 respectively.

As a month containing thirty-one days appears in the window 12 the gear segment 53 of the disc 38 meshes with the pinion 48 which rotates the pinion 45 and also the pinion 42 through the gear 43 so that the bushing 41 and the disc 56 carried thereby are rotated to display the corresponding days of the month through the window. By the same means the disc 39 having segments 54 corresponding to the months having thirty days thereon rotates the pinion 49 and this pinion also rotates the pinion 45 and the pinion 42 through the gear 43, which also rotates the disc 56. The difference in diameters of the pinions 48, 49 and 50 makes it possible with substantially the same circular pitch to provide thirty-one teeth on the pinion 48, thirty teeth on the pinion 49, and twenty-eight teeth on the pinion 50 so that the number of teeth on the pinions corresponds with the number of teeth in the gear segments of the disc.

The disc 56 is provided with three concentric series of figures indicating the days of the month, the outer series 57 containing thirty-one figures, the intermediate series 58 containing thirty figures and the inner series 59 containing twenty-eight figures. These different series of figures are displayed or covered by a disc 60 wherein during a month having thirty-one days the outer series is displayed, during a month having thirty days the intermediate series is displayed, and during the month of February having twenty-eight days the inner series is displayed.

The disc 60 is rotatably mounted by a pin 61 in the plate 16 and the rear surface thereof is provided with lugs 62 which are positioned to be engaged by a lug 63 on the face of the disc 56 whereby each time the disc 56 makes one complete revolution the disc 60 is advanced one step, and with twelve of the lugs 62 equally spaced on the disc 60 the disc will be advanced to display the months in sequence.

The disc 60 is provided with extending lugs 64 with spaces 65 between the lugs and, as shown in Figure 3, the numerals of the outer series 57 are displayed through the spaces 65 between the lugs 64. The disc 60 is also provided with openings 66 through which the numerals of the intermediate series representing the months having thirty days are displayed and also an inner opening 67 through which the days of the month of February are displayed.

The discs 38, 39, and 40 are secured together by rivets 68 as shown in Figure 5.

Figure 1:
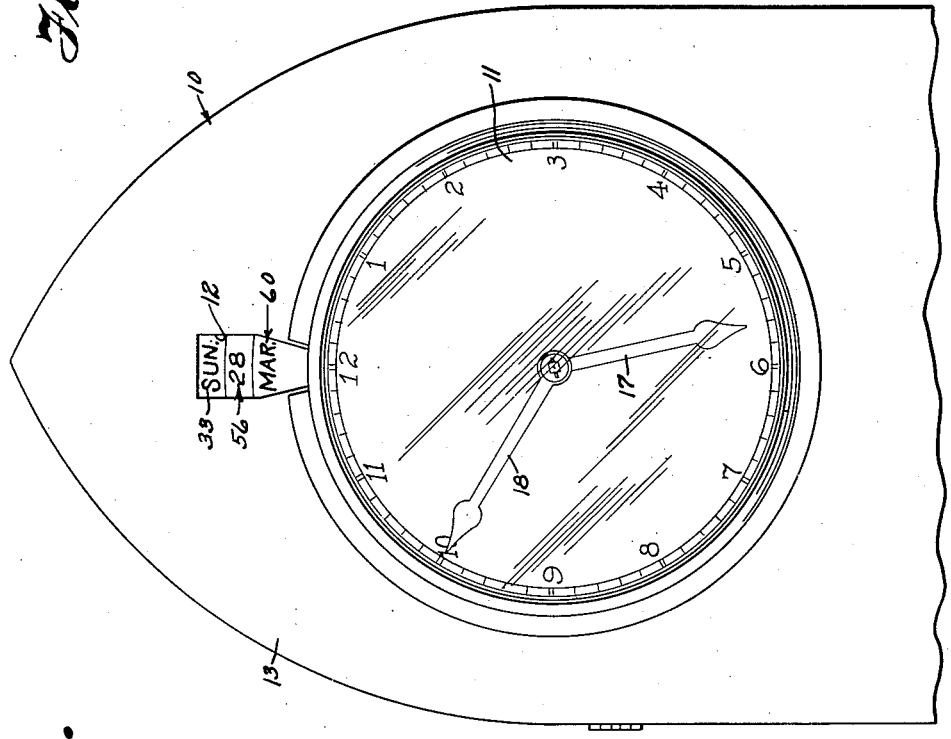
Figure 1 is a view showing a front elevation of a clock with the days of the week, days of the month and names of the months showing through an opening positioned directly above the dial of a clock.

With the parts arranged in this manner it will be noted from Figures 1 and 3 that the day of the week will be positioned in the upper part of the window 12 and the positions of the days of the month and names of the months will be alternated in the lower part of the window. It will also be noted that with the parts arranged in this manner the calendar will operate continuously for a period of four years at which time it will be reset to compensate for twenty-nine days in February.

The calendar is operated by the hour hand shaft of a clock with the gear 21, which is fixedly attached to the hour hand shaft, turning the member 28 through the train of gears 22, 24 and 26 whereby the actuator 30 is rotated one notch every 24 hours, the actuator making one complete revolution each week, and upon rotation of the actuator the shaft 32 is rotated which turns the pinion 35 and also the disc 33 and the disc 36, which meshes with the gear segments on the discs 38, 39 and 40, rotates the three discs one step each time the actuator 30 is moved by the member 28.

The gear segments on the discs 38, 39 and 40 form a continuous gear and the teeth of these segments are positioned to mesh with small pinions 48, 49 and 50 on the inclined shaft 51 whereby upon rotation of one of these pinions, all three of the pinions rotate and at the same time the pinion 45 is rotated. The pinion 45 meshes with the gear 43 and the gear 43, meshing with the gear 42 on the bushing 41 rotates the bushing 41 and disc 56, on the face of which the rows of numerals corresponding with the different numbers of days of the month are provided. The disc 56, therefore, rotates once each month irrespective of the number of days of the month, the difference being compensated for by the varying sizes of the pinions 48, 49 and 50 on the inclined shaft 45. Each pinion makes a complete revolution with its respective month and, consequently, the disc 56 is advanced accordingly.

The calendar mechanism is, therefore, operated by the hour hand of the clock through the pinion 21 and with the disc 56 rotating in a clockwise direction the lug 63 will pick up one of the lugs 62, moving it to a distance of one twelfth of the circumference, and then dropping the lug so that the name of the next month shows through the window.

In the design illustrated in Figures 11 to 19 inclusive, the mechanism is substantially the same as that shown in the former figures except that an additional disc, similar to the discs 38, 39 and 40, is provided for the month of February having twenty-nine days and a device is provided for actuating this extra disc once every four years.

In this design discs 70, 71 and 72, corresponding to the discs 38, 39 and 40, and also an additional disc 73, are rotatably mounted on a bushing 74 similar to the bushing 41 and mounted on the tubular shaft 75 of the hour hand corresponding to the shaft 14. This device is operated by a pinion 76 on the hour hand shaft which rotates the gear 77 through the intermediate gears 78 and 79. The gear 77 turns the cam 80 which moves the actuator 81 similar to the actuator 30, and this rotates the pinion 82 that meshes with the gear segments on the peripheral surfaces of the discs 70, 71, 72 and 73. These discs are freely rotatable on the bushing 74 and the disc 70 shown in Figure 14 is provided with gear segments having thirty-one teeth corresponding to the months having thirty-one days, the segments being indicated by the numeral 83, the disc 71, shown in Figure 15 having gear segments 84 with thirty teeth corresponding to months having thirty days, the disc 72, shown in Figure 16 having gear segments 85 with twenty-eight teeth corresponding with the month of February in years other than leap year and the disc 73 shown in Figure 17 having a gear segment 86 with twenty-nine teeth therein corresponding to the month of February in leap year. These discs are divided into three periods having 365 days and one period having 366 days and with the discs joined together by rivets 87 and rotating simultaneously the calendar mechanism may be operated continuously for periods longer than four years.

This device is provided with a disc 88 corresponding to the disc 56 and the outer surface of the disc 88 is provided with four series of numbers, an outer series 89 for a month having thirty-one days, an intermediate series 90 for a month having thirty days, another intermediate series 91 for the month of February having twenty-nine days, and an inner series 92 for the month of February having twenty-eight days. The disc 88 is provided with a lug 93 that actuates a disc 94 similar to the disc 60 through lugs 95 on the back of the disc 94, and the disc 94 is provided with a lug 96 that actuates an element 97 through lugs 98 on the rear face thereof once every four years so that the days of the month of February, when February has twenty-nine days will show through a space 99 in the periphery of the element 97, as shown in Figure 19. The element 97 is provided with open spaces 100, 101, and 102 that are positioned to display the days of the month of February when the month of February has twenty-eight days. The element 97 is pivotally mounted on a pin 103 of a plate 104 similar to the plate 16 and the disc 94 is also rotatably mounted on this plate by a pin 105.

The disc 94 is similar to the disc 60 having open areas 106 in the periphery for displaying the days of the months having thirty-one days, and openings 107 for displaying the days of the months having thirty days.

The gear segments on the discs 70, 71, 72 and 73 mesh with and actuate the pinions 108 on a shaft 109 and these pinions rotate the pinion 110 which, through a gear similar to the gear 43, rotates the bushing 74 through the pinion 111. This device is also provided with a disc 112 similar to the disc 33, on which the days of the week are provided and this disc is rotated by the pinion 82.

With the parts arranged in this manner the hour hand shaft 75 of the clock will operate the calendar mechanism continuously for comparatively long periods with the month of February showing twenty-eight days for three consecutive years and then, by means of the element 97, showing twenty-nine days for the fourth year.

The device may be formed of comparatively light weight material and with the parts formed of thin material they may be incorporated between the clock works and face of a clock as illustrated in Figure 2.

It will be understood that other modifications may be made in the design and arrangement of the parts without departing from the spirit of the invention.

What is claimed is:

1. A calendar clock comprising a main disc having a plurality of series of numerals corresponding with months having different numbers of days therein concentrically positioned around the outer edge thereof, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the discs alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, means displaying the numerals of a series on the main disc corresponding with the number of days of a month and also the name of the month simultaneously, and means consecutively displaying the days of the weeks corresponding with the days of the months in combination therewith.

2. A calendar clock comprising a main disc having a plurality of series of numerals corresponding with months having different numbers of days therein concentrically positioned around the outer edge thereof, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the disc alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, a small disc having spaces in the periphery thereof and openings therethrough rotatably mounted in front of the main disc with the spaces and openings in registering positions with the series of numerals on the main disc, said small disc having the names of the months thereon, and means advancing the small disc one step with each revolution of the main disc.

3. A calendar clock comprising a main disc having a plurality of series of numerals corresponding with months having different numbers of days therein concentrically positioned around the outer edge thereof, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the disc alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, a small disc having spaces in the periphery thereof and openings therethrough rotatably mounted in front of the main disc with the spaces and openings in registering positions with the series of numerals on the main disc, said small disc having the names of the months thereon, twelve lugs positioned on the rear surface of the small disc corresponding with the months of a year, and one lug on the face of the main disc positioned to engage the lugs of the small disc whereby the small disc is advanced one step with each revolution of the main disc.

4. A calendar clock comprising a main disc having a plurality of series of numerals corresponding with months having different numbers of days therein concentrically positioned around the outer edge thereof, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the discs alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, means displaying the numerals of a series on the main disc corresponding with the number of days of a month and also the name of the month simultaneously, means consecutively displaying the days of the weeks corresponding with the days of the months in combination therewith, and additional means actuating the displaying means whereby once in four years the 29th day in February is displayed.

5. A calendar clock comprising a main disc having a plurality of series of numerals corresponding with months having different numbers of days therein concentrically positioned around the outer edge thereof with an outer series having designations for 31 days therein, an intermediate series having designations for 30 days therein, another intermediate series having designations for 29 days therein and an inner series with designations for 28 days therein, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the disc alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, a small disc having spaces in the periphery thereof and openings therethrough rotatably mounted in front of the main disc with the spaces and openings in registering positions with the series of numerals on the main disc, said small disc having the names of the months thereon, twelve lugs positioned on the rear surface of the small disc corresponding with the months of a year, one lug on the face of the main disc positioned to engage the lugs of the small disc whereby the small disc is advanced one step with each revolution of the main disc, an element having one recess in the periphery and openings in three sides thereof rotatably mounted in front of the small disc with the recess positioned to register with the series of numerals of the month of February having twenty-nine days and with the openings positioned to register with the series of numerals of the month of February having twenty-eight days, four lugs on the rear surface of said element, and one lug on the face of the small disc positioned to engage the lugs of the element to advance the element one step every year.

6. A calendar clock comprising a main disc having a plurality of series of numerals corresponding with months having different numbers of days therein concentrically positioned around the outer edge thereof with an outer series having designations for 31 days therein, an intermediate series having designations for 30 days therein, another intermediate series having designations for 29 days therein and an inner series with designations for 28 days therein, a bushing rotatably mounted on the hour hand shaft of a clock, said main disc carried by the bushing, a plurality of discs having bear segments on the peripheries thereof rotatably mounted on said bushing, a plurality of pinions of different diameters positioned to mesh with the gear segments of the disc alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, a small disc having spaces in the periphery thereof and openings therethrough rotatably mounted in front of the main disc with the spaces and openings in registering positions with the series of numerals on the main disc, said small disc having the names of the months thereon, twelve lugs positioned on the rear surface of the small disc corresponding with the months of a year, one lug on the face of the main disc positioned to engage the lugs of the small disc whereby the small disc is advanced one step with each revolution of the main disc, an element having one recess in the periphery and openings in three sides thereof rotatably mounted in front of the small disc with the recess positioned to register with the series of numerals of the month of February having twenty-nine days and with the openings positioned to register with the series of numerals of the month of February having twenty-eight days, four lugs on the rear surface of said element, one lug on the face of the small disc positioned to engage the lugs of the element to advance the element one step every year, and means mounting the said calendar instrumentalities in a clock with the days of the week, days of the month, and names of the months positioned to register with a window in the face of the clock.

7. A calendar clock comprising a main disc having a plurality of series of numerals corresponding with months having different numbers of days therein concentrically positioned around the outer edge thereof, a bushing rotatably mounted on the hour hand shaft of a clock, said main disc carried by the bushing, a plurality of discs having gear segments on the peripheries thereof rotatably mounted on said bushing, a plurality of pinions of different diameters positioned to mesh with the gear segments of the disc alternately, a driving pinion rotated by the said plurality of pinions, means rotating the bushing and main disc by the driving pinion, an actuator having seven recesses in the periphery thereof, a cam meshing with the recesses of the actuator consecutively, means rotating the cam once with two revolutions of the hour hand shaft, a pinion rotated by the actuator and meshing with the gear segments of the discs, a small disc having spaces in the periphery thereof and openings therethorugh rotatably mounted in front of the main disc with the spaces and openings in registering positions with the series of numerals on the main disc, said small disc having the names of the months thereon, twelve lugs positioned on the rear surface of the small disc corresponding with the months of a year, one lug on the faces of the main disc positioned to engage the lugs of the small disc whereby the small disc is advanced one step with each revolution of the main disc, and means mounting the said calendar instrumentalities in a clock with the days of the week, days of the month, and names of the months positioned to register with a window in the face of the clock.

PETTER P. OSTEVIK.

REFERENCES CITED

The following references are of record in the file of this patent:

UNITED STATES PATENTS

| Number | Name | Date |
|---|---|---|
| 2,286,000 | Neyhart | June 9, 1942 |

FOREIGN PATENTS

| Number | Country | Date |
|---|---|---|
| 14,200 | Great Britain | of 1898 |
| 494,568 | Germany | Apr. 8, 1930 |